United States Patent
Mao et al.

(10) Patent No.: US 10,250,722 B2
(45) Date of Patent: Apr. 2, 2019

(54) TCP TRAFFIC PRIORITY BANDWIDTH MANAGEMENT CONTROL BASED ON TCP WINDOW ADJUSTMENT

(71) Applicant: Dell Software Inc., Round Rock, TX (US)

(72) Inventors: Miao Mao, Shanghai (CN); Zhong Chen, San Jose, CA (US)

(73) Assignee: SONICWALL INC., Milpitas, CA (US)

( * ) Notice: Subject to any disclaimer, the term of this patent is extended or adjusted under 35 U.S.C. 154(b) by 163 days.

(21) Appl. No.: 14/975,625

(22) Filed: Dec. 18, 2015

(65) Prior Publication Data

US 2017/0180230 A1   Jun. 22, 2017

(51) Int. Cl.
- G06F 15/173 (2006.01)
- H04L 29/06 (2006.01)
- H04L 12/851 (2013.01)
- H04L 12/807 (2013.01)

(52) U.S. Cl.
CPC .......... H04L 69/16 (2013.01); H04L 47/2408 (2013.01); H04L 47/2433 (2013.01); H04L 47/27 (2013.01)

(58) Field of Classification Search
CPC ........................ H04L 43/0876; H04L 47/27
USPC ................................................ 709/223, 226
See application file for complete search history.

(56) References Cited

U.S. PATENT DOCUMENTS

| | | | |
|---|---|---|---|
| 7,203,169 B1 * | 4/2007 | Okholm | H04L 41/0803 370/232 |
| 7,505,447 B2 | 3/2009 | Kish et al. | |
| 7,787,436 B2 | 8/2010 | Kish et al. | |
| 8,089,949 B2 | 1/2012 | Kish et al. | |
| 8,125,975 B2 | 2/2012 | Kish et al. | |
| 8,355,343 B2 | 1/2013 | Kish et al. | |
| 8,547,899 B2 | 10/2013 | Kish | |
| 8,619,662 B2 | 12/2013 | Kish | |
| 8,634,402 B2 | 1/2014 | Kish | |
| 8,638,708 B2 | 1/2014 | Kish | |
| 8,780,760 B2 | 7/2014 | Kish | |
| 8,824,357 B2 | 9/2014 | Kish | |
| 9,019,165 B2 | 4/2015 | Shtrom | |
| 9,066,152 B2 | 6/2015 | Kish | |
| 9,071,942 B2 | 6/2015 | Kish | |

(Continued)

OTHER PUBLICATIONS

U.S. Appl. No. 15/085,180 Office Action dated Apr. 2, 2018.

*Primary Examiner* — Suraj M Joshi
*Assistant Examiner* — Joel Mesa
(74) *Attorney, Agent, or Firm* — Polsinelli LLP

(57) ABSTRACT

The present disclosure relates to an apparatus, a method, and a non-transitory computer readable storage medium for managing bandwidth in a computer network. The method may identify that a first received packet belongs to a first traffic class and a second received packet belongs to a second traffic class where the first traffic class is associated with a higher priority than the second traffic class. The method may also identify that the first and the second traffic classes compete for shared bandwidth at the computer network. The method may monitor a number of bytes received that are associated with the first traffic class and second traffic class and perform a series of calculations used to adjust a window size according to the relative priorities of the first and the second traffic class.

20 Claims, 5 Drawing Sheets

(56) References Cited

U.S. PATENT DOCUMENTS

| | | |
|---|---|---|
| 9,240,868 B2 | 1/2016 | Kish |
| 9,271,327 B2 | 2/2016 | Kish |
| 9,661,475 B2 | 5/2017 | Kish |
| 2005/0088972 A1* | 4/2005 | Zhang .................... H04L 47/10 370/235 |
| 2011/0013608 A1 | 1/2011 | Lee et al. |
| 2011/0040969 A1 | 2/2011 | Yao et al. |
| 2011/0119401 A1 | 5/2011 | Miu et al. |
| 2013/0107706 A1 | 5/2013 | Raleigh |
| 2014/0099967 A1 | 4/2014 | Egner et al. |
| 2017/0289837 A1 | 10/2017 | Duo |
| 2018/0054759 A1 | 2/2018 | Seok |

* cited by examiner

TCP TRAFFIC PRIORITY BANDWIDTH MANAGEMENT CONTROL BASED ON TCP WINDOW ADJUSTMENT

BACKGROUND OF THE INVENTION

Field of the Invention

The present invention is generally directed to managing communications on a computer network. More specifically, the present invention makes a series of calculations when making adjustments that affect amounts of network bandwidth allocated to flows of data over the computer network.

Description of the Related Art

Computer networks today use various mechanisms to control how overall amounts of available bandwidth available on a computer network are allocated to different communications transmitted over the computer network.

In certain instances a portion of a total available bandwidth may be allocated to different clients or processes based on a classification or priority. For example, in the instance when a dial up link bandwidth may provide data through put rates of up to 10 megabits per second (Mbps) and both a first and a second user wish to consume all of or a significant portion of that available bandwidth, administration policies that allocate bandwidth to those users may identify that network traffic associated with the first user is classified as having a high priority and that network traffic associated with the second user is classified as having a low priority. In such an instance, network traffic associated with the first user will usually be allocated more bandwidth then network traffic associated with the second user. The total bandwidth allocated to the first user and the second user may be less than the total available network bandwidth of 10 Mbps, where processes associated with first user may be allocated a bandwidth of 5 Mbps and processes allocated with the second user may be allocated a bandwidth of 1 Mbps. After the process associated with the first and the second user are allocated an initial amount of bandwidth, those processes may compete for any additional amount of bandwidth that may be provided by the computer network. As such, bandwidth allocated to processes associated with the first user may end up with an allocation of 8 Mbps and processes associated with the second user may end up with an allocation of 2 Mbps. Such class based network bandwidth management methodologies while being somewhat effective, the may not allocate optimal amounts of bandwidth to processes over time. For example, a higher priority process may be allocated higher amounts of network bandwidth even in instances when an amount of data associated with the higher priority process fluctuates over time.

A first type of mechanism that has been used to manage network bandwidth is queuing. When queuing is used, a receiver may queue received packets as more packets from different processes are received at a computer network. These packets may be queued until the computer network has bandwidth available for those packets to be transmitted over the network. One significant limitation of queuing received packets relates to memory, the more packets queued at a computer network, a larger amount of memory must be allocated to storing received packets by the network. Since the utilization of more memory increases costs associated with operating a computer network, managing bandwidth by increasing queue size increases costs associated with running and maintaining a computer network.

A second type of mechanism that has been proposed to manage network bandwidth uses the transfer control protocol (TCP). Such methods implemented on TCP use an advertised window that is sent to a client in an acknowledge message packet. The advertised window provides a measure of window size to a client that corresponds to an amount of data that a client sends to a target network in a packet. In such implementations, a client or sender of packets may periodically receive an acknowledge message that includes an advertised widow where the size of the window may vary over time. Such methods may reduce the size of an advertised window when an input traffic rate exceeds a target rate, thus slowing a net amount of data sent by the client to a target network per unit time. Such methods, however, provide limited benefits to a client or an administrator of a computer network. This is because processes that may be more important to a client or an administrator are treated with the same priority as processes that are less important to the client or the administrator.

In yet another approach, a computer network may simply drop packets when large numbers of packets are sent to the computer network. Dropping packets, however, may cause clients to increase a number of packets sent to a computer network because the clients may re-send packets the dropped packets to the computer network at a later time, causing more packets to be dropped. As such, bandwidth management techniques that drop packets are relatively crude and may be ineffective.

What is needed are queue-less data management methods and systems that intelligently manage available network bandwidth over time according to preferences or priorities that benefit clients and administrators.

SUMMARY OF THE PRESENTLY CLAIMED INVENTION

The presently claimed invention relates to an apparatus, a method, and a non-transitory computer readable storage medium for managing bandwidth in a computer method. A method of the presently claimed invention may include a network device receiving packets of different traffic classes. The method of the invention may identify that a first packet is associated with a first traffic class and that a second packet is associated with a second traffic class. The method may also identify that the first traffic class and the second traffic class compete for shared bandwidth at the computer network. Next the method may monitor a number of bytes received that are associated with the first traffic class over a first time interval and calculate a value for a competitive base adjusted window (CBAW) value. Then the method may calculate a first priority window size (PWS) that is proportional to a first traffic priority index (TPI) and the calculated based adjusted window (CBAW) value. Next the method may calculate a first prioritized adjusted window (PAW) value using a formula that includes the calculated first PWS, after which the first PAW value may be sent to a client device in an acknowledge message packet. The method may then receive packets of the first traffic class over a second interval of time where each of the packets of the first traffic class received over the second interval of time include a number of bytes that correspond to the calculated PAW value sent to the client.

When the method of the presently claimed invention is implemented as a non-transitory computer readable storage medium, a processor executing instructions may identify that a first received packet is associated with a first traffic class and that a second received packet is associated with a second traffic class. The processor may also identify that the first traffic class and the second traffic class compete for shared bandwidth at the computer network. Next the processor may monitor a number of bytes received that are associated with the first traffic class over a first time interval and calculate a value for a competitive base adjusted window (CBAW) value. Then the processor may calculate a first priority window (PWS) size that is proportional to a first traffic priority index (TPI) and the calculated based adjusted window (CBAW) value. Next the processor may calculate a first prioritized adjusted window (PAW) value using a formula that includes the calculated first PWS, after which the first PAW value may be sent to a client device in an acknowledge message packet. A network interface at the computer network may then receive packets of the first traffic class over a second interval of time where each of the packets of the first traffic class received over the second interval of time include a number of bytes that correspond to the calculated PAW value sent to the client.

When an apparatus of the presently claimed invention implements a method of the presently claimed invention, a network interface at the apparatus may receive a first and a second packet. A processor executing instructions out of a memory may identify that the first received packet is associated with a first traffic class and that the second received packet is associated with a second traffic class. The processor may also identify that the first traffic class and the second traffic class compete for shared bandwidth at the computer network. Next the processor may monitor a number of bytes received that are associated with the first traffic class over a first time interval and calculate a value for a competitive base adjusted window (CBAW) value. Then the processor may calculate a first priority window (PWS) size that is proportional to a first traffic priority index (TPI) and the calculated based adjusted window (CBAW) value. Next the processor may calculate a first prioritized adjusted window (PAW) value using a formula that includes the calculated first PWS, after which the first PAW value may be sent to a client device in an acknowledge message packet over the network interface. Then the network interface may receive packets of the first traffic class over a second interval of time where each of the packets of the first traffic class received over the second interval of time include a number of bytes that correspond to the calculated PAW value sent to the client.

DETAILED DESCRIPTION

The present disclosure relates to an apparatus, a method, and a non-transitory computer readable storage medium for managing the allocation of available network bandwidth in a computer network. Methods consistent with the present disclosure may combine features and functions that are commonly used in computer networking with new features and functions of the present disclosure.

Figure 1:
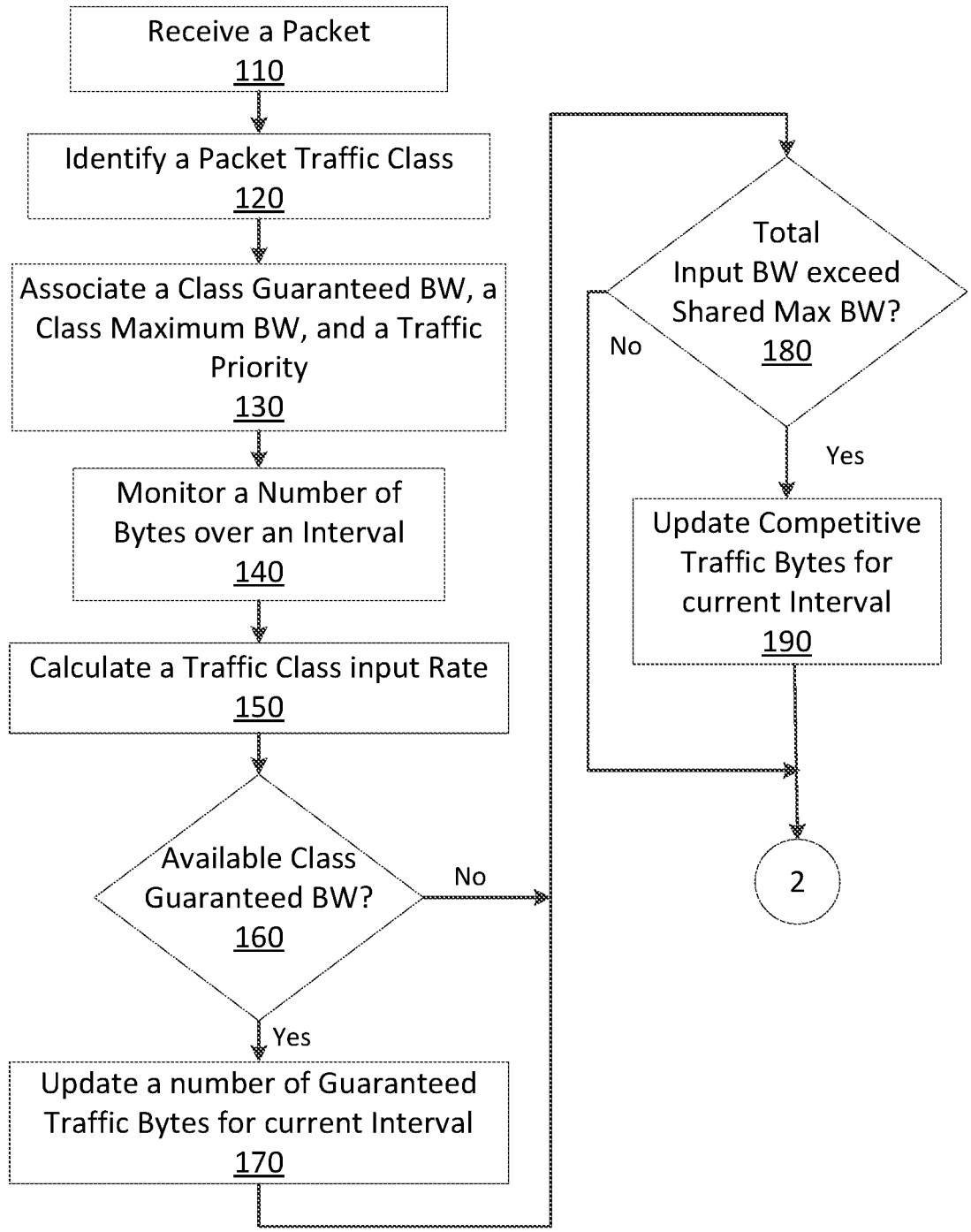
FIG. 1 illustrates an exemplary flow chart where information sent over a computer network is analyzed and classified when preparing to identify how best to manage message traffic in a computer network.

FIG. 1 illustrates an exemplary flow chart where information sent over a computer network is analyzed and classified when preparing to identify how best to manage message traffic in a computer network. A first step 110 in FIG. 1 is where a packet is received at a computer network. After the packet is received a traffic class associated with the packet is identified in step 120. Then in step 130 a class guaranteed bandwidth (CGB), a class maximum bandwidth (CMB), and a traffic priority (TP) are associated with the packet.

Step 140 of FIG. 1 monitors an input rate associated with a flow of packets or a class of packets by monitoring a number of bytes received from a client over an interval of time. After a number of bytes of data have been received that are associated with the traffic class, a traffic class input rate may be calculated in step 150 from the number of bytes of data received over the interval of time. A traffic class input rate may be calculated for various sets of received packets where each set of received packets may be associated with a different class of packet. As such, step 150 may calculate numerous different traffic class input rates where each specific traffic class input rate may be associated with a different class of packet.

Step 160 may then identify whether there is any class guaranteed bandwidth available that may be associated to the traffic class. When identifying whether there is an available guaranteed bandwidth associated with a particular traffic class, a current utilization of bandwidth associated with that particular traffic class may be compared with a class guaranteed bandwidth (CGB) of the particular traffic class. When the current utilization of bandwidth associated with a traffic class is less than the CGB of that traffic class, step 160 may identify that there is available guaranteed bandwidth associated with that traffic class, and program flow may move from step 160 to step 170. Step 170 may then update a number of guaranteed traffic bytes that are associated with that traffic class for a current interval of time.

When step 160 identifies that there is no available class guaranteed bandwidth (CGB) associated the traffic class or after step 170, program flow moves to determination step 180. Step 180 then identifies whether a total input bandwidth exceeds a shared maximum bandwidth (SMB). When the total input bandwidth exceeds the shared maximum bandwidth (SMB), program flow moves from step 180 to step 190. Step 190 may then update a number of competitive traffic bytes for the current interval of time.

Figure 2:
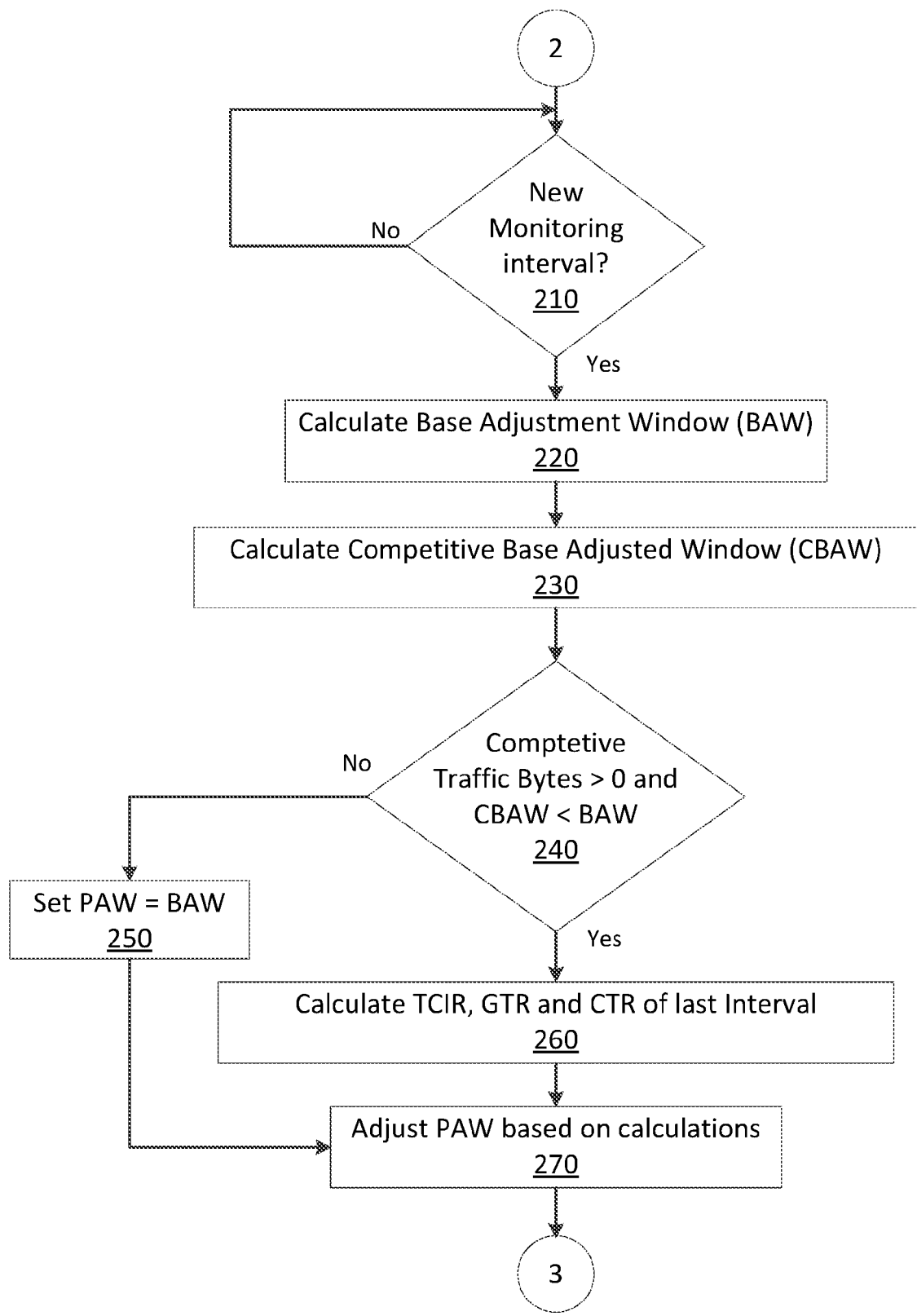
FIG. 2 illustrates a flow chart of program flow where an advertised window may be adjusted according to measured network metrics and according to a priority of a traffic class.

When step 180 identifies that the total input rate does not exceed the shared maximum bandwidth (SMB) or after step 190, program flow may move to a first step of FIG. 2. This is indicated by the number 2 endpoint of FIG. 1. The total input rate may correspond to a rate of received packet data from all classes of packets. The total input rate may, therefore, correspond to a measure of total bandwidth currently being consumed by all data packets received by a computer network.

FIG. 2 illustrates a flow chart of program flow where an advertised window may be adjusted according to measured network metrics and according to a priority of a traffic class. FIG. 2 begins at step 210 and step 210 may be a continuation of program flow from the last step of FIG. 1 as indicated by the number 2 in both FIG. 1 and in FIG. 2. Step 210 may monitor packets received at the computer network over an interval of time. Program flow may stay at step 210 until the interval of time has expired. Next program flow may move to step 220 where a base adjustment window (BAW) may be calculated. In certain instances the base adjusted window (BAW) may be calculated by comparing the input traffic rate with a target rate. When the current input rate exceeds the target rate, the advertised window provided to a client in a TCP acknowledge message may be reduced according to the calculated BAW. Alternatively, when the current input rate is less than the target rate, the advertised window provided to a client may not be changed.

Step 230 may then calculate a value of a competitive base adjusted window (CBAW). The CBAW may be calculated when there are two or more classes of network traffic or two or more clients that are competing for available unallocated network bandwidth. Such competition may occur when more than one TCP traffic class attempt to increase an amount of network bandwidth during the same interval of time. When a calculated value of CBAW is less than (<) a calculated value of BAW, an acknowledge packet sent to a client may includes an advertised window with a value that is based on a calculated value of a prioritized adjustment window (PAW) that is calculated from a CBAW value instead of being based on a calculated value of BAW. Note that step 240 of FIG. 2 first identifies that at least two different classes of packets are competing for bandwidth. This is indicated in FIG. 2 step 240 where competitive traffic bytes are greater than (>) zero (0). When competitive traffic bytes are >0 and a calculated measure of CBAW<BAW program flow moves to step 260, otherwise program flow moves to step 250. Step 250 sets a measure of prioritized adjustment window (PAW) equal to the calculated value of BAW. After step 250 program flow moves to step 270 where PAW may be adjusted.

As mentioned above when competitive traffic bytes are >0 and a calculated measure of CBAW<BAW program flow moves from step 240 to step 260. Step 260 may then calculate a value of total class input rate (TCIR), guaranteed traffic rate (GTR), and a competitive traffic rate (CTR). Step 270 may then adjust a value of a prioritized adjustment window (PAW) based on the calculations of TCIR, GTR, CTR, and other factors.

Note, depending on circumstances a value for PAW may be identified by using different calculations. When there is no competition for bandwidth or when CBAW>BAW, a value of PAW may be set equal to the calculation of standard base adjustment window (BAW). In instances when there is competition for bandwidth and when a calculated value of CBAW<a calculated BAW, PAW may be set as a function of other factors.

In certain instances PAW may be a function of a priority window size (PWS) that corresponds to a measure or setting of traffic priority (TP). Note that each distinct traffic class may be assigned a different traffic priority and may be associated with a different priority window size where high priority traffic will be assigned a greater window size than lower priority traffic. Measures of priority may be associated with a traffic priority index (TPI) and a traffic priority count (TPC). In certain instances a TPI value of 0 may indicate that a class of packets has a highest priority and where increasing values of TPI correspond to lower priorities as the TPI value increases. The traffic priority count may correspond to a number of total priority counts that may be assigned to a packet. For example, when a set of TPI values include 0, 1, 2, and 3, the TPC associated with this set of TPI values will be 4.

To better distribute bandwidth to all competing traffic classes a calculated value of CBAW may be modified to an adjusted CBAW (i.e. CBAW'). For example, CBAW' may be set equal to CBAW/2 (i.e. CBAW'=CBAW/2). In such an instance the priority window size (PWS) may be calculated according to the formula: PWS=(CBAW'*TPI/TPC)*(CTR/TCIR). Thus, PWS may be proportional to an adjusted competitive base adjusted window value (CBAW'), a traffic priority index (TPI) value, and a competitive traffic rate (CTR). PWS may also be inversely proportion to a traffic priority count (TPC) and a traffic class input rate (TCIR). In certain instances a value for CBAW' may correspond to a number of competitive bytes received over an interval of time or that are requested by processes competing for shared bandwidth.

The calculated prioritized adjusted window (PAW) may be a function of the adjusted competitive window value (CBAW') a calculated value of PWS and a value of guaranteed window size (GWS). In certain instances this GWS value may be proportional CBAW' and a guaranteed transfer rate (GTR) and be inversely proportional to a value of TCIR. As such GWS may be calculated by the formula: GWS=(CBAW'/2) (GTR/TCIR). PAW in such an instance may=CBAW'−PWS+GWS.

In instances where the traffic class input rate is less than a guaranteed bandwidth an alternate value of guaranteed window size GWS' may be use when calculating PAW. In such an instance GWS' may=GWS+(GWS/2) and PAW may be calculated by the formula PAW=CBAW'−PWS+GWS'.

As such, step 270 of FIG. 2 may calculate a prioritized adjusted window size (PAW) differently based on different circumstances and conditions. After step 270, FIG. 2 ends with item 3. Item 3 indicates that FIG. 2 may be continued with a first step of FIG. 3.

Figure 3:
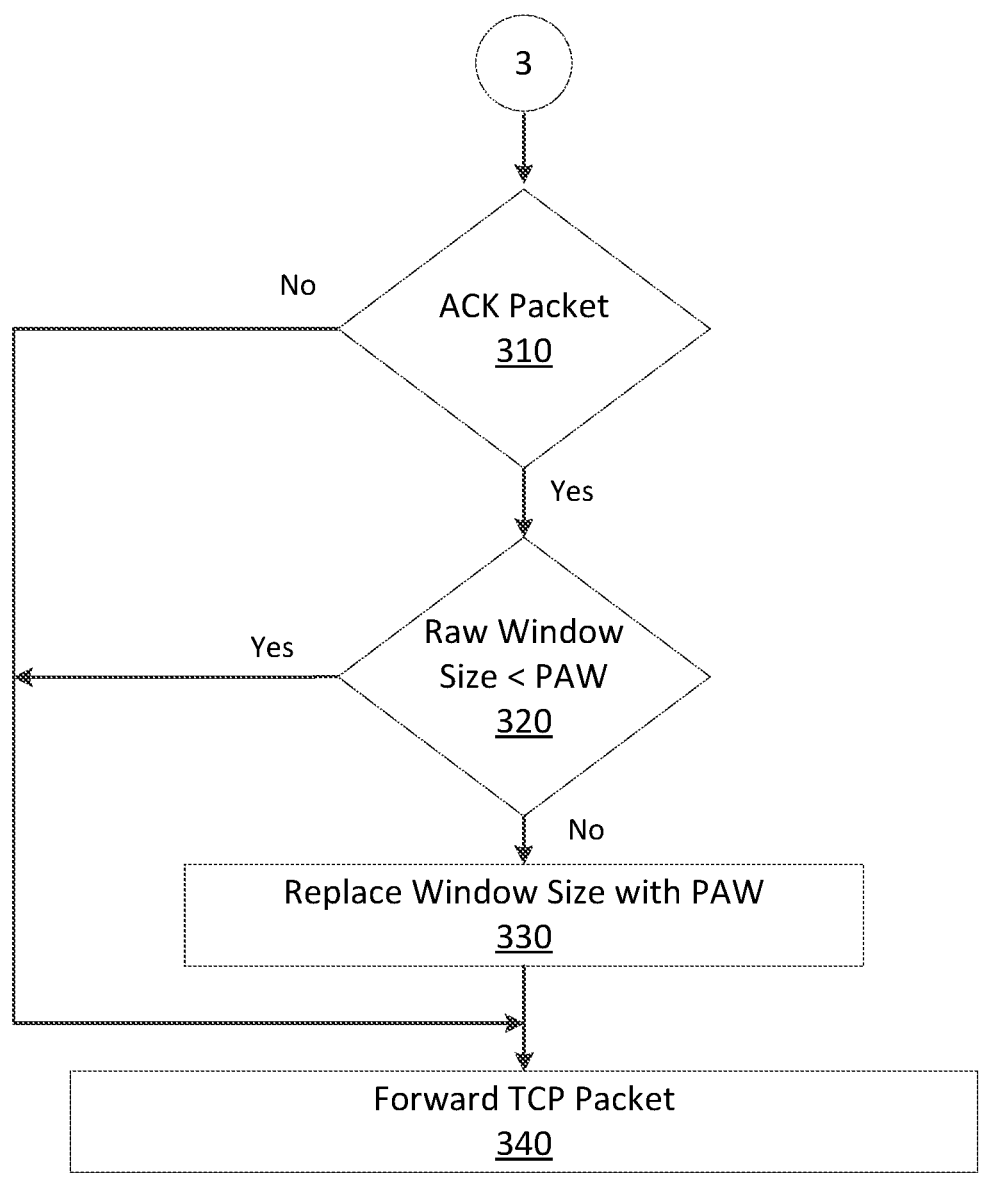
FIG. 3 illustrates a method according to the present disclosure that changes an advertised window according to a prioritized adjusted window.

FIG. 3 illustrates a method according to the present disclosure that changes an advertised window according to a prioritized adjusted window. Step 310 may identify whether an acknowledge packet may be sent to a client. In an instance where an acknowledge packet should not presently be sent to the client, program flow moves to step 340 where a received packet may be forwarded to a destination. When step 310 identifies that an acknowledge packet should be sent to the client, program flow moves to step 320. When a raw window size is less than a PAW size program flow also moves to step 340 where the received packet is forwarded to a destination.

When step 320 of FIG. 3 identifies that the raw window size is not less than PAW, then program flow moves to step 330 where an advertised window size is set to PAW. In this instance, an acknowledge message may be sent to the client setting the advertised window size to the PAW size. Next in step 340 a received packet is forwarded to a destination.

Figure 4:
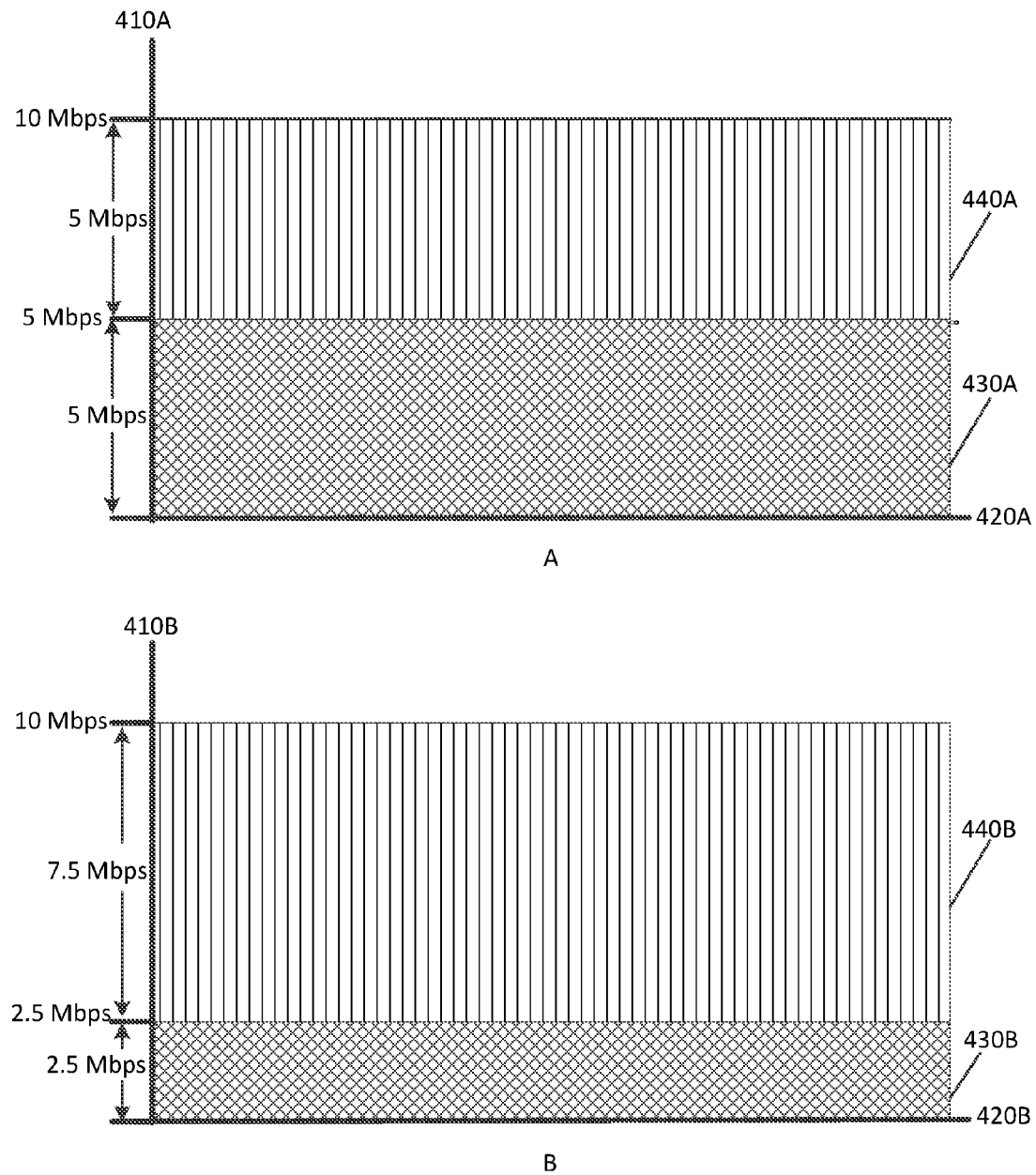
FIG. 4 comparatively illustrates measurements of network bandwidth consumed by different packet flows in instances when the priorities of classes of packets are considered versus instances where the priorities of packet classes are not considered when allocating bandwidth.

FIG. 4 comparatively illustrates measurements of network bandwidth consumed by different packet flows in instances when the priorities of classes of packets are considered versus instances where the priorities of packet classes are not considered when allocating bandwidth. FIG. 4, part A shows a vertical axis 410A of egress transfer rate in Megabits per second (Mbps) where two classes of packets share a total bandwidth of 10 Mbps. Here a first class of packets 430A are currently consuming a bandwidth of 5 Mbps and a second class of packets 440A are currently consuming a bandwidth of 5 Mbps. FIG. 4, part A illustrates shared bandwidth according to a method that does not consider the priority of a class of packets when bandwidth is shared between a first class of packets 430A and a second class of packets 440A. The horizontal axis 120A of FIG. 4, part A is elapsed time.

In contrast FIG. 4, part B illustrates shared bandwidth according to a method of the present disclosure, where the priority of a first class of packets 430B is lower than the priority of the second class of packets 440B. Here again a vertical axis 410B illustrates an egress transfer rate in Megabits per second (Mbps) where two classes of packets share a total bandwidth of 10 Mbps. In this instance, the first class of packets 430B are currently consuming a bandwidth of 2.5 Mbps and the second class of packets 440B are currently consuming a bandwidth of 7.5 Mbps. The horizontal axis 420B of FIG. 4, part B is also elapsed time. FIG. 4 illustrates that algorithms that allocate bandwidth based on the priority of a class of packets causes an increased amount of bandwidth to be allocated to higher priority classes of packets than to lower priority classes of packets.

Figure 5:
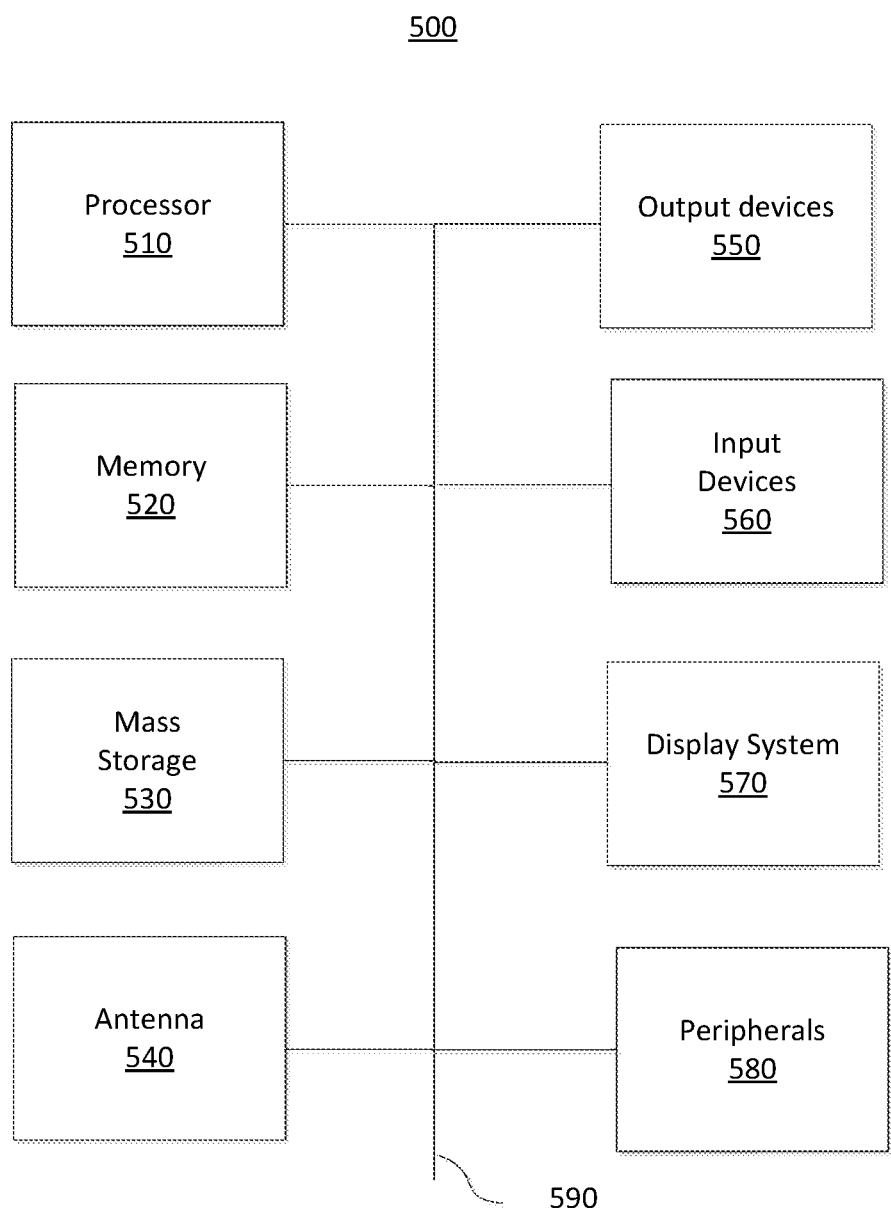
FIG. 5 is a block diagram of a device for implementing the present technology.

FIG. 5 is a block diagram of a device for implementing the present technology. FIG. 5 illustrates an exemplary computing system 500 that may be used to implement a computing device for use with the present technology. The computing system 500 of FIG. 5 includes one or more processors 510 and memory 520. Main memory 520 may store, in part, instructions and data for execution by processor 510. Main memory can store the executable code when in operation. The system 500 of FIG. 5 further includes a storage 520, which may include mass storage and portable storage, antenna 540, output devices 550, user input devices 560, a display system 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the storage 530, peripheral device(s) 580 and display system 570 may be connected via one or more input/output (I/O) buses.

Storage device 530, which may include mass storage implemented with a magnetic disk drive or an optical disk drive, may be a non-volatile storage device for storing data and instructions for use by processor unit 510. Storage device 530 can store the system software for implementing embodiments of the present invention for purposes of loading that software into main memory 510.

Portable storage device of storage 530 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device.

Antenna 540 may include one or more antennas for communicating wirelessly with another device. Antenna 540 may be used, for example, to communicate wirelessly via Wi-Fi, Bluetooth, with a cellular network, or with other wireless protocols and systems. The one or more antennas may be controlled by a processor 510, which may include a controller, to transmit and receive wireless signals. For example, processor 510 execute programs stored in memory 520 to control antenna 540 transmit a wireless signal to a cellular network and receive a wireless signal from a cellular network.

The system 500 as shown in FIG. 5 includes output devices 550 and input device 560. Examples of suitable output devices include speakers, printers, network interfaces, and monitors. Input devices 560 may include a touch screen, microphone, accelerometers, a camera, and other device. Input devices 560 may include an alpha-numeric keypad, such as a keyboard, for inputting alpha-numeric and other information, or a pointing device, such as a mouse, a trackball, stylus, or cursor direction keys.

Display system 570 may include a liquid crystal display (LCD), LED display, or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method for managing bandwidth in a computer network, the method comprising:
   receiving a first packet sent from a first client;
   identifying a first traffic class associated with the first packet;
   receiving a second packet;
   identifying a second traffic class associated with the second packet;
   identifying that the first traffic class and the second traffic class are competing for shared bandwidth;
   monitoring a first number of bytes received that are associated with the first traffic class over a first interval of time;

calculating a competitive base adjusted window value based on the identified competition for the shared bandwidth;

assigning a first traffic priority index to the first traffic class;

calculating a first traffic class input rate associated with the first number of bytes received that are associated with the first traffic class over the first interval of time;

calculating a first priority window size to associate with packets of the first traffic class that is proportional to the first traffic priority index and to the calculated competitive base adjusted window value and that is inversely proportional to a total priority count, wherein the total priority count is a count of a number of priority classes to which one of the packets is assigned;

calculating a value of a first prioritized adjusted window to include in an acknowledge message to send to the first client, wherein the calculation of the first prioritized adjusted window value is a function of the first priority window size and the competitive base adjusted window value;

transmitting the acknowledge message to the first client, wherein the acknowledge message includes the first prioritized adjusted window value, and the first client changes a first transmitted number of bytes sent in one or more packets; and receiving the one or more packets over a second interval of time of the first traffic class, wherein the received one or more packets of the first traffic class include a number of bytes corresponding to a changed first number of bytes value.

2. The method of claim 1, wherein the first priority window size is also inversely proportional a total class input rate, wherein the total class input rate corresponds to the number received bytes that are associated with the first traffic class and that are received over the first interval of time.

3. The method of claim 2, further comprising calculating a guaranteed window size to assign to the first traffic class.

4. The method of claim 3, wherein the guaranteed window size assigned to the first traffic class is proportional to a guaranteed traffic rate associated with the first traffic class and the competitive base adjusted window value.

5. The method of claim 4, wherein the guaranteed window size is also inversely proportional to the total class input rate.

6. The method of claim 5, wherein the function for calculating the first prioritized adjusted window is further based on the guaranteed window size.

7. The method of claim 6, wherein the function for the calculation of the first prioritized adjusted window is according to a formula where the first prioritized adjusted window equals the competitive base adjusted window value minus the calculated value of the first priority window size plus the guaranteed window size.

8. The method of claim 1, further comprising:
monitoring a third number of bytes received that are associated with the second traffic class;

assigning a second traffic priority index to the second traffic class;

calculating a second traffic class input rate associated with the third number of bytes received that are associated with the second traffic class over the first interval of time;

calculating a second priority window size to associate with packets of the second traffic class, wherein the second calculated priority window size is proportional to the second traffic priority;

calculating a value of a second prioritized adjusted window to include in a second acknowledge message to send to a sender of the second packet, wherein the calculation of the second prioritized adjusted window value includes the second priority window size;

transmitting the second acknowledge message to the sender of the second packet, wherein the acknowledge message includes the second prioritized adjusted window value, and the sender of the second packet changes a second transmitted number of bytes value; and receiving the one or more other packets over the second interval of time, wherein the one or more other packets include a number of bytes corresponding to the changed second transmitted number of bytes value.

9. The method of claim 8, further comprising:
monitoring a number of bytes received that are associated with the first and the second traffic class over the second interval of time;

calculating a second value of the first prioritized adjusted window size;

calculating a second value of the second prioritized adjusted window size;

transmitting a third acknowledge message to the first client that includes the second value of the first prioritized adjusted window size;

transmitting a fourth acknowledge message to the sender of the second packet that includes the second value of the second prioritized adjusted window size;

receiving a plurality of additional packets from the client over a third interval of time, wherein the plurality of additional packets received from the first client over the third interval of time includes a number of bytes corresponding to the second value of the first prioritized adjusted window size; and receiving a plurality of other packets from the sender of the second packet over the third interval of time, wherein the plurality of additional packets received from the sender of the second packet over the third interval of time includes a number of bytes corresponding to the second value of the second prioritized adjusted window size.

10. The method of claim 1, wherein the competitive base adjusted window value corresponds to a number of bytes associated with competitive traffic received over the first interval of time.

11. A non-transitory computer-readable storage medium having embodied thereon a program executable by a processor for performing a method for managing bandwidth in a computer network, the method comprising:
receiving a first packet sent from a first client;
identifying a first traffic class associated with the first packet;
receiving a second packet;
identifying a second traffic class associated with the second packet;
identifying that the first traffic class and the second traffic class are competing for shared bandwidth;
monitoring a first number of bytes received that are associated with the first traffic class over a first interval of time;
calculating a competitive base adjusted window value based on the identified competition for the shared bandwidth;
assigning a first traffic priority index to the first traffic class;

calculating a first traffic class input rate associated with the first number of bytes received that are associated with the first traffic class over the first interval of time;

calculating a first priority window size to associate with packets of the first traffic class that is proportional to the first traffic priority index and to the calculated competitive base adjusted window value and that is inversely proportional to a total priority count, wherein the total priority count is a count of a number of priority classes to which one of the packets is assigned;

calculating a value of a first prioritized adjusted window to include in an acknowledge message to send to the first client, wherein the calculation of the first prioritized adjusted window value is a function of the first priority window size and the competitive base adjusted window value;

transmitting the acknowledge message to the first client, wherein the acknowledge message includes the first prioritized adjusted window value, and wherein the first client changes a first transmitted number of bytes sent in one or more packets; and receiving the one or more packets over a second interval of time of the first traffic class, wherein the received one or more packets of the first traffic class include a number of bytes corresponding to a changed first number of bytes value.

12. The non-transitory computer-readable storage medium of claim 11, wherein the first priority window size is also inversely proportional to a total class input rate, and the total class input rate corresponds to the number received bytes that are associated with the first traffic class and that are received over the first interval of time.

13. The non-transitory computer-readable storage medium of claim 12, the program further executable to calculate a guaranteed window size to assign to the first traffic class.

14. The non-transitory computer-readable storage medium of claim 13, wherein the guaranteed window size assigned to the first traffic class is proportional to a guaranteed traffic rate associated with the first traffic class and the competitive base adjusted window value.

15. The non-transitory computer-readable storage medium of claim 14, wherein the guaranteed window size is also inversely proportional to the total class input rate.

16. The non-transitory computer-readable storage medium of claim 15, wherein the function for calculating the first prioritized adjusted window also includes the guaranteed window size.

17. The non-transitory computer-readable storage medium of claim 16, wherein the function for the calculation of the first prioritized adjusted window is according to a formula where the first prioritized adjusted window equals the competitive base adjusted window value minus the calculated value of the first priority window size plus the guaranteed window size.

18. The non-transitory computer-readable storage medium of claim 11, the program further executable to:

monitor a third number of bytes received that are associated with the second traffic class;

assign a second traffic priority index to the second traffic class;

calculate a second traffic class input rate associated with the third number of bytes received that are associated with the second traffic class over the first interval of time;

calculate a second priority window size to associate with packets of the second traffic class, wherein the second calculated priority window size is proportional to the second traffic priority index;

calculate a value of a second prioritized adjusted window to include in a second acknowledge message to send to a sender of the second packet, wherein the calculation of the second prioritized adjusted window value includes the second priority window size;

transmit the second acknowledge message to the sender of the second packet, wherein the acknowledge message includes the second prioritized adjusted window value, and the sender of the second packet changes a second transmitted number of bytes value; and receive the one or more other packets over the second interval of time, wherein the one or more other packets include a number of bytes corresponding to the changed second transmitted number of bytes value.

19. The non-transitory computer-readable storage medium of claim 18, program further executable to:

monitor a number of bytes received that are associated with the first and the second traffic class over the second interval of time;

calculate a second value of the first prioritized adjusted window size;

calculate a second value of the second prioritized adjusted window size;

transmit a third acknowledge message to the first client that includes the second value of the first prioritized adjusted window size;

transmit a fourth acknowledge message to the sender of the second packet that includes the second value of the second prioritized adjusted window size;

receive a plurality of additional packets from the client over a third interval of time, wherein the plurality of additional packets received from the first client over the third interval of time includes a number of bytes corresponding to the second value of the first prioritized adjusted window size; and receive a plurality of other packets from the sender of the second packet over the third interval of time, wherein the plurality of additional packets received from the sender of the second packet over the third interval of time includes a number of bytes corresponding to the second value of the second prioritized adjusted window size.

20. An apparatus for managing bandwidth in a computer network, the apparatus comprising:

a network interface that receive a first packet sent from a first client and that receives a second packet;

a memory; and a processor, wherein:

the processor executing instructions out of the memory:

identifies a first traffic class associated with the first packet, identifies a second traffic class associated with the second packet, identifies that the first traffic class and the second traffic class are competing for shared bandwidth, monitors a first number of bytes received that are associated with the first traffic class over a first interval of time, calculates a competitive base adjusted window value based on the identified competition for the shared bandwidth, assigns a first traffic priority index to the first traffic class, calculates a first traffic class input rate associated with the first number of bytes received that are associated with the first traffic class over the first interval of time, calculates a first priority window size to associate with packets of the first traffic class that is proportional to the first traffic priority index and to the calculated competitive base adjusted window value and that is inversely proportional to a total priority count, wherein the total priority count is a count of a number of priority classes to which one of the packets is assigned, and calculates a value of a first prioritized adjusted window to include in an acknowledge message to send to the first client, wherein the calculation of the first prioritized adjusted window value is a function of the first priority window size and the competitive base adjusted window value, wherein the network interface:

transmits the acknowledge message to the first client, wherein the acknowledge message includes the first prioritized adjusted window value, and the first client changes a first transmitted number of bytes sent in one or more packets, and receives the one or more packets over a second interval of time of the first traffic class, wherein the received one or more packets of the first traffic class include a number of bytes corresponding to a changed first number of bytes value.

* * * * *